United States Patent
Levy et al.

(10) Patent No.: US 10,073,834 B2
(45) Date of Patent: Sep. 11, 2018

(54) SYSTEMS AND METHODS FOR LANGUAGE FEATURE GENERATION OVER MULTI-LAYERED WORD REPRESENTATION

(71) Applicant: INTERNATIONAL BUSINESS MACHINES CORPORATION, Armonk, NY (US)

(72) Inventors: Ran Levy, Givatayim (IL); Eyal Shnarch, Tel Aviv, NY (US); Noam Slonim, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 15/018,877

(22) Filed: Feb. 9, 2016

(65) Prior Publication Data

US 2017/0228365 A1    Aug. 10, 2017

(51) Int. Cl.
*G06F 17/27* (2006.01)
*G06F 17/30* (2006.01)

(52) U.S. Cl.
CPC ........ *G06F 17/278* (2013.01); *G06F 17/2715* (2013.01); *G06F 17/2785* (2013.01); *G06F 17/30707* (2013.01)

(58) Field of Classification Search
CPC ............... G06F 17/278; G06F 17/2715; G06F 17/2785; G06F 17/30707
USPC ........................................................... 704/9
See application file for complete search history.

(56) References Cited

U.S. PATENT DOCUMENTS

| | | | |
|---|---|---|---|
| 8,140,323 B2 | 3/2012 | Johnson et al. | |
| 8,423,348 B2 | 4/2013 | Rehberg et al. | |
| 2007/0213973 A1* | 9/2007 | Rehberg | G06F 17/278 704/9 |
| 2008/0228467 A1* | 9/2008 | Womack | G06F 17/271 704/9 |
| 2013/0246322 A1* | 9/2013 | De Sousa Webber | G06N 3/0454 706/18 |
| 2014/0156264 A1 | 6/2014 | Etzioni et al. | |
| 2015/0363386 A1* | 12/2015 | Song | G06F 17/2785 704/9 |

* cited by examiner

*Primary Examiner* — Bharatkumar S Shah

(57) ABSTRACT

There is provided a computer-implemented method for outputting one or more cross-layer patterns to identify a target semantic phenomenon in text, the method comprising: extracting, for each word of at least some words of each training text fragment of training text fragments designated as representing a target semantic phenomenon, feature-values defined by respective layers; statistically analyzing the feature-values identified for the training text fragments to identify one or more cross-layer patterns comprising layers representing a common pattern for the training text fragments, the common cross-layer pattern defining one or more feature-values of a respective layer of one or more words and at least another feature-value of another respective layer of another word; and outputting the identified cross-layer pattern(s) for identifying a text fragment representing the target semantic phenomenon.

19 Claims, 11 Drawing Sheets

{[TOPIC_LEX_MATCH],[@thatcomp]}
{[TOPIC],[verb],[SENTIMENT]}
{[@subj],[@thatcomp]}
{[TOPIC_LEX_MATCH],[@thatcomp],[SENTIMENT]}
{[@subj],[@thatcomp],[SENTIMENT]}
{[TOPIC_LEX_MATCH],[verb],[SENTIMENT]}
{[TOPIC],[verb]}
{[verb],[verb],[SENTIMENT]}
{[SENTIMENT],[@thatcomp]}
{[@thatcomp],[adj]}
{[@thatcomp],[TOPIC_LEX_MATCH]}
{[adj],[@thatcomp]}
{[TOPIC],[@thatcomp]}
{[verb],[SENTIMENT]}
{[verb],[SENTIMENT],[SENTIMENT]}
{[TOPIC_LEX_MATCH],[TOPIC_LEX_MATCH],[@thatcomp]}
{[adj],[verb],[SENTIMENT]}
{[@subj],[TOPIC_LEX_MATCH],[@thatcomp]}
{[SENTIMENT],[verb],[SENTIMENT]}
{[TOPIC],[verb],[adj]}
{[verb],[TOPIC_LEX_MATCH],[SENTIMENT]}
{[SENTIMENT],[SENTIMENT]}
{[verb],[@subj],[SENTIMENT]}
{[TOPIC]}
{[<<adj.all],[SENTIMENT]}
{[@obj],[@subj],[SENTIMENT]}
{[SENTIMENT],[TOPIC_LEX_MATCH],[@thatcomp]}
{[verb],[SENTIMENT],[verb]}
{[TOPIC_LEX_MATCH],[SENTIMENT]}
{[TOPIC_LEX_MATCH],[SENTIMENT],[SENTIMENT]}
{[verb],[TOPIC],[verb]}
{[@obj],[TOPIC_LEX_MATCH],[@thatcomp]}
{[TOPIC],[verb],[verb]}
{[TOPIC_LEX_MATCH],[@thatcomp],[<<adj.all]}
{[@thatcomp],[@obj]}
{[@nadj],[@subj],[@thatcomp]}
{[@thatcomp],[@nadj]}
{[verb],[<<adj.all],[SENTIMENT]}
{[@obj],[SENTIMENT],[SENTIMENT]}
{[@subj],[SENTIMENT]}
{[verb],[SENTIMENT],[TOPIC_LEX_MATCH]}
{[@top],[@subj],[@thatcomp]}
{[adj],[@thatcomp],[SENTIMENT]}
{[@obj],[@subj]}
{[adj],[@subj],[SENTIMENT]}
{[SENTIMENT],[adj]}

| FIG. 5A |
|---------|
| FIG. 5B |
| FIG. 5C |
| FIG. 5D |
| FIG. 5E |
| FIG. 5F |
| FIG. 5G |

{[@thatcomp],[det]}
{[SENTIMENT],[TOPIC_LEX_MATCH],[verb]}
{[<<adj.all],[TOPIC_LEX_MATCH],[@thatcomp]}
{[@thatcomp],[adj],[SENTIMENT]}
{[SENTIMENT],[@thatcomp],[SENTIMENT]}
{[verb],[@subj],[verb]}
{[TOPIC_LEX_MATCH, @subj],[@thatcomp]}
{[@obj],[SENTIMENT]}
{[TOPIC],[verb],[TOPIC_LEX_MATCH]}
{[@obj],[verb],[SENTIMENT]}
{[SENTIMENT],[verb]}
{[TOPIC],[@subj],[SENTIMENT]}
{[TOPIC_LEX_MATCH],[@thatcomp],[prep]}
{[verb],[SENTIMENT],[adj]}
{[@subj],[@thatcomp],[prep]}
{[TOPIC],[@subj]}
{[SENTIMENT],[TOPIC_LEX_MATCH]}
{[TOPIC_LEX_MATCH],[verb],[adj]}
{[TOPIC],[TOPIC_LEX_MATCH]}
{[verb],[verb],[<<adj.all]}
{[<<noun.act],[@thatcomp]}
{[TOPIC_LEX_MATCH],[SENTIMENT],[verb]}
{[SENTIMENT],[TOPIC_LEX_MATCH],[SENTIMENT]}
{[@subj],[SENTIMENT],[SENTIMENT]}
{[@subj],[@subj],[@thatcomp]}
{[SENTIMENT],[verb],[adj]}
{[@obj],[TOPIC_LEX_MATCH],[SENTIMENT]}
{[TOPIC_LEX_MATCH],[TOPIC_LEX_MATCH],[SENTIMENT]}
{[det],[@thatcomp]}
{[TOPIC],[verb],[@obj]}
{[@subj],[@obj],[@subj]}
{[SENTIMENT],[SENTIMENT],[SENTIMENT]}
{[SENTIMENT],[SENTIMENT],[verb]}
{[TOPIC_LEX_MATCH],[@subj],[SENTIMENT]}
{[TOPIC],[SENTIMENT],[adj]}
{[verb],[TOPIC_LEX_MATCH],[verb]}
{[verb],[SENTIMENT, adj]}
{[<<adj.all],[TOPIC_LEX_MATCH],[SENTIMENT]}
{[TOPIC],[SENTIMENT],[verb]}
{[TOPIC],[SENTIMENT],[SENTIMENT]}
{[verb],[TOPIC]}
{[@obj],[@subj],[adj]}
{[TOPIC_LEX_MATCH],[SENTIMENT, adj]}
{[SENTIMENT],[verb],[verb]}
{[@thatcomp],[adj, SENTIMENT]}
{[@subj],[@obj],[SENTIMENT]}

FIG. 5B

{[SENTIMENT]}
{[SENTIMENT],[SENTIMENT],[TOPIC_LEX_MATCH]}
{[prep],[@thatcomp]}
{[SENTIMENT],[TOPIC],[verb]}
{[SENTIMENT],[TOPIC]}
{[@thatcomp],[adj],[TOPIC_LEX_MATCH]}
{[SENTIMENT],[verb],[TOPIC_LEX_MATCH]}
{[@thatcomp],[det],[SENTIMENT]}
{[verb],[TOPIC],[SENTIMENT]}
{[TOPIC_LEX_MATCH],[SENTIMENT],[adj]}
{[@subj],[TOPIC],[verb]}
{[@subj],[TOPIC_LEX_MATCH],[SENTIMENT]}
{[SENTIMENT],[adj, SENTIMENT]}
{[TOPIC_LEX_MATCH],[verb],[@thatcomp]}
{[SENTIMENT],[adj],[SENTIMENT]}
{[verb],[SENTIMENT],[prep]}
{[<<adj.all],[SENTIMENT],[verb]}
{[SENTIMENT],[@thatcomp],[adj]}
{[@nadj],[@subj],[SENTIMENT]}
{[TOPIC],[verb],[prep]}
{[@top],[@subj],[verb]}
{[@subj],[@subj]}
{[TOPIC],[SENTIMENT],[TOPIC_LEX_MATCH]}
{[@nobj],[@thatcomp]}
{[adj],[TOPIC],[verb]}
{[TOPIC],[verb],[@nadj]}
{[verb],[<<adj.all],[verb]}
{[adj],[@thatcomp],[adj]}
{[TOPIC],[adj, SENTIMENT]}
{[@obj],[verb],[adj]}
{[adj, SENTIMENT],[SENTIMENT]}
{[TOPIC, <<noun.act],[verb]}
{[TOPIC],[TOPIC_LEX_MATCH],[verb]}
{[TOPIC_LEX_MATCH, @subj],[SENTIMENT]}
{[TOPIC],[@nadj, adj]}
{[@subj],[TOPIC]}
{[<<adj.all],[verb]}
{[adj],[@subj],[verb]}
{[@subj],[SENTIMENT],[verb]}
{[SENTIMENT],[SENTIMENT],[adj]}
{[TOPIC],[TOPIC_LEX_MATCH],[SENTIMENT]}
{[SENTIMENT],[@subj]}
{[SENTIMENT],[prep],[TOPIC_LEX_MATCH]}
{[SENTIMENT],[@obj],[SENTIMENT]}
{[TOPIC],[<<noun.act]}
{[@top],[@subj],[SENTIMENT]}

FIG. 5C

{[TOPIC, @subj]}
{[verb],[<<adj.all]}
{[@obj],[TOPIC_LEX_MATCH],[verb]}
{[verb],[<<noun.state]}
{[@obj],[TOPIC],[verb]}
{[SENTIMENT],[@subj],[SENTIMENT]}
{[TOPIC_LEX_MATCH],[@obj],[@thatcomp]}
{[@subj],[@obj],[@thatcomp]}
{[<<adj.all],[SENTIMENT],[SENTIMENT]}
{[verb],[@subj],[<<adj.all]}
{[@subj],[SENTIMENT],[@thatcomp]}
{[verb],[<<adj.all],[@subj]}
{[TOPIC_LEX_MATCH],[<<adj.all]}
{[verb],[<<adj.all],[@thatcomp]}
{[TOPIC],[<<noun.act],[verb]}
{[TOPIC_LEX_MATCH, SENTIMENT],[@thatcomp]}
{[TOPIC_LEX_MATCH],[verb],[verb]}
{[@thatcomp],[TOPIC_LEX_MATCH, SENTIMENT]}
{[@obj],[SENTIMENT],[verb]}
{[<<adj.all],[verb],[verb]}
{[@obj],[@subj],[TOPIC_LEX_MATCH]}
{[TOPIC],[SENTIMENT],[prep]}
{[TOPIC],[verb],[det]}
{[SENTIMENT],[prep],[SENTIMENT]}
{[@thatcomp],[@pred]}
{[@thatcomp],[TOPIC_LEX_MATCH],[TOPIC_LEX_MATCH]}
{[@thatcomp],[@nobj]}
{[@obj],[<<adj.all]}
{[<activity:n:1],[@thatcomp]}
{[@obj],[verb]}
{[@subj],[SENTIMENT],[TOPIC_LEX_MATCH]}
{[TOPIC_LEX_MATCH],[@obj],[SENTIMENT]}
{[@subj],[adj, SENTIMENT]}
{[SENTIMENT],[@obj]}
{[verb],[TOPIC_LEX_MATCH],[adj]}
{[<<adj.all],[TOPIC_LEX_MATCH],[verb]}
{[@top],[@thatcomp],[SENTIMENT]}
{[SENTIMENT],[TOPIC],[SENTIMENT]}
{[TOPIC_LEX_MATCH],[<<adj.all],[SENTIMENT]}
{[SENTIMENT],[SENTIMENT],[@obj]}
{[SENTIMENT],[verb],[@obj]}
{[TOPIC_LEX_MATCH],[SENTIMENT],[@thatcomp]}
{[@subj],[adj],[SENTIMENT]}
{[TOPIC_LEX_MATCH],[@obj],[@subj]}
{[<<adj.all],[@subj]}
{[verb],[TOPIC, @subj]}

FIG. 5D

```
{[verb],[TOPIC_LEX_MATCH, @subj]}
{[verb],[@auxcomp],[SENTIMENT]}
{[@subj],[<<adj.all]}
{[@obj],[<<adj.all],[SENTIMENT]}
{[adj, SENTIMENT],[@thatcomp]}
{[TOPIC_LEX_MATCH],[<<adj.all],[verb]}
{[TOPIC_LEX_MATCH],[@subj],[verb]}
{[SENTIMENT],[SENTIMENT],[prep]}
{[@subj],[@subj],[verb]}
{[SENTIMENT],[adj],[TOPIC_LEX_MATCH]}
{[@thatcomp],[TOPIC_LEX_MATCH],[SENTIMENT]}
{[adj],[TOPIC],[@thatcomp]}
{[SENTIMENT],[TOPIC_LEX_MATCH],[adj]}
{[SENTIMENT],[@thatcomp],[TOPIC_LEX_MATCH]}
{[adj],[@thatcomp],[prep]}
{[adj],[@thatcomp],[TOPIC_LEX_MATCH]}
{[TOPIC],[det],[SENTIMENT]}
{[adj, SENTIMENT],[verb]}
{[TOPIC_LEX_MATCH],[SENTIMENT],[TOPIC_LEX_MATCH]}
{[SENTIMENT],[adj],[verb]}
{[SENTIMENT],[TOPIC],[@thatcomp]}
{[TOPIC],[SENTIMENT],[@obj]}
{[SENTIMENT],[SENTIMENT],[@thatcomp]}
{[SENTIMENT],[<<noun.state]}
{[adj],[verb]}
{[<<noun.act],[verb],[SENTIMENT]}
{[@subj],[SENTIMENT],[adj]}
{[@subj],[TOPIC],[SENTIMENT]}
{[@obj],[SENTIMENT],[TOPIC_LEX_MATCH]}
{[@subj],[adj],[@thatcomp]}
{[TOPIC_LEX_MATCH],[<<noun.act],[@thatcomp]}
{[verb],[<<adj.all],[TOPIC_LEX_MATCH]}
{[@top],[TOPIC],[@thatcomp]}
{[adj],[TOPIC],[SENTIMENT]}
{[<act:n:1],[@thatcomp]}
{[<express:v:1],[@subj]}
{[det],[@thatcomp],[SENTIMENT]}
{[TOPIC_LEX_MATCH],[TOPIC],[verb]}
{[@obj],[SENTIMENT, adj]}
{[@obj],[SENTIMENT],[adj]}
{[SENTIMENT],[prep]}
{[TOPIC_LEX_MATCH],[SENTIMENT],[@obj]}
{[@thatcomp],[<<noun.act]}
{[<<noun.act],[@thatcomp],[adj]}
{[TOPIC_LEX_MATCH],[SENTIMENT],[prep]}
{[TOPIC],[SENTIMENT],[@nadj]}
```

FIG. 5E

{[adj],[@thatcomp],[@nadj]}
{[SENTIMENT],[@obj],[verb]}
{[SENTIMENT],[prep],[@thatcomp]}
{[@obj],[TOPIC_LEX_MATCH, @subj]}
{[adj],[TOPIC]}
{[prep],[TOPIC],[verb]}
{[TOPIC],[verb],[@auxcomp]}
{[<present:v:1, <express:v:1]}
{[@thatcomp],[adj],[@obj]}
{[verb],[SENTIMENT],[@obj]}
{[@thatcomp],[det],[prep]}
{[prep],[SENTIMENT],[SENTIMENT]}
{[SENTIMENT],[prep],[verb]}
{[TOPIC],[adj],[SENTIMENT]}
{[TOPIC_LEX_MATCH],[verb],[<<noun.state]}
{[TOPIC],[@subj],[adj]}
{[TOPIC_LEX_MATCH],[<<noun.state]}
{[@thatcomp],[det],[adj]}
{[SENTIMENT],[@thatcomp],[prep]}
{[SENTIMENT],[TOPIC_LEX_MATCH],[TOPIC_LEX_MATCH]}
{[<<noun.act],[@thatcomp],[TOPIC_LEX_MATCH]}
{[adj],[@subj],[<<adj.all]}
{[TOPIC, @subj],[@obj]}
{[<<noun.state],[SENTIMENT]}
{[adj],[verb],[<<adj.all]}
{[TOPIC_LEX_MATCH],[@obj],[verb]}
{[TOPIC],[@thatcomp],[@nadj]}
{[<<adj.all],[<<noun.act],[@thatcomp]}
{[SENTIMENT],[adj],[@subj]}
{[det],[TOPIC],[verb]}
{[@thatcomp],[adj],[prep]}
{[@subj],[@obj],[TOPIC_LEX_MATCH]}
{[TOPIC_LEX_MATCH],[TOPIC_LEX_MATCH],[verb]}
{[SENTIMENT],[<<noun.act],[@thatcomp]}
{[<<adj.all],[SENTIMENT],[TOPIC_LEX_MATCH]}
{[@obj],[TOPIC_LEX_MATCH]}
{[adj],[verb],[TOPIC_LEX_MATCH]}
{[verb],[TOPIC_LEX_MATCH, SENTIMENT]}
{[@thatcomp],[@lconj]}
{[TOPIC, @subj],[@thatcomp]}
{[TOPIC, <<noun.act],[@thatcomp]}
{[SENTIMENT],[@obj],[@subj]}
{[verb],[adv],[SENTIMENT]}
{[@subj],[<<adj.all],[verb]}
{[adv],[SENTIMENT]}
{[verb],[verb],[verb]}

FIG. 5F

{[@thatcomp],[@obj],[TOPIC_LEX_MATCH]}
{[TOPIC],[@obj],[SENTIMENT]}
{[@subj],[TOPIC_LEX_MATCH, @subj]}
{[@thatcomp],[TOPIC_LEX_MATCH],[verb]}
{[CLAIM_LEX_MATCH]}
{[adj],[@thatcomp],[det]}
{[TOPIC_LEX_MATCH, SENTIMENT],[verb]}
{[@thatcomp],[<abstraction:n:1]}
{[TOPIC_LEX_MATCH],[verb]}
{[@obj],[TOPIC]}
{[TOPIC],[@obj],[verb]}
{[TOPIC, <event:n:1],[verb]}
{[adj],[verb],[@obj]}
{[@subj],[<<noun.state]}
{[@obj],[@subj],[prep]}
{[SENTIMENT],[@obj],[TOPIC_LEX_MATCH]}
{[SENTIMENT],[adj],[@thatcomp]}
{[<<adj.all],[adj],[SENTIMENT]}
{[@nadj],[SENTIMENT],[@thatcomp]}
{[TOPIC_LEX_MATCH, SENTIMENT],[SENTIMENT]}
{[@subj],[adj],[@subj]}
{[det],[TOPIC],[SENTIMENT]}
{[SENTIMENT],[TOPIC_LEX_MATCH, SENTIMENT]}
{[TOPIC_LEX_MATCH],[adv],[SENTIMENT]}

FIG. 5G

SYSTEMS AND METHODS FOR LANGUAGE FEATURE GENERATION OVER MULTI-LAYERED WORD REPRESENTATION

BACKGROUND

The present invention, in some embodiments thereof, relates to machine learning and, more specifically, but not exclusively, to systems and methods for automated machine learning to identify a target in human-readable text.

Different methods have been developed to identify patterns in human-readable text. For example, methods have been developed to identify a pair of words in the text (mostly nouns) that are related to each other in a specific, well-defined semantic relationship. For example, author-title, and person-birthday, hypernyms, and meronyms.

SUMMARY

According to an aspect of some embodiments of the present invention there is provided a computer-implemented method for outputting one or more cross-layer patterns to identify a target semantic phenomenon in text, the method comprising: extracting, for each word of at least some words of each training text fragment of training text fragments designated as representing a target semantic phenomenon, feature-values defined by respective layers; statistically analyzing the feature-values identified for the training text fragments to identify one or more cross-layer patterns comprising layers representing a common pattern for the training text fragments, the common cross-layer pattern defining one or more feature-values of a respective layer of at least one word and at least another feature-value of another respective layer of another word; and outputting the identified cross-layer pattern(s) for identifying a text fragment representing the target semantic phenomenon.

Optionally, the method further comprises training a statistical classifier to identify the target semantic phenomenon by matching or correlating feature-values extracted from a new text fragment to at least one of the cross-layer pattern(s); and storing or transmitting the trained statistical classifier for analyzing new text to identify new text fragment(s) representing the target semantic phenomenon. Optionally, the identifying is performed for training text fragments designated as not representing the target semantic phenomenon, and the classifier is trained based on feature-values extracted from the training text fragments designated as not representing the target semantic phenomenon.

Optionally, the cross-layer pattern includes at least one negative feature-value that does not appear in a text fragment that includes the target semantic phenomenon.

Optionally, each layer of cross-layer pattern(s) is a member selected from the group consisting of: semantic, syntactic, domain knowledge, and injection of knowledge by task expert. Alternatively or additionally, each layer of the cross-layer pattern(s) is a member selected from the group consisting of: part-of-speech (POS) tag of the word, hypernym of the word, a named entity represented by the word, sentiment represented by the word, word appearing in a predefined lexicon.

Optionally, the cross-layer pattern includes one or more words in the text fragment associated with multiple different layers.

Optionally, the multiple different layers are combined for the one or more words.

Optionally, the cross-layer pattern includes two or more different words in the text fragment each associated with a different layer.

Optionally, the different layers associated with the two or more different words are defined by an order within the cross-layer pattern.

Optionally, the target semantic phenomenon is a member of the group consisting of: a definition, a statement providing evidence for or against a topic, a statement made by an entity that something is the case about a topic without evidence, and a sentiment expressed by an entity about a topic.

Optionally, the cross-layer pattern includes at least one defined gap between two or more layers each from a different word.

Optionally, the cross-layer pattern is created by iteratively combining features to generate longer cross-layer patterns. Optionally, the method further comprises applying a greedy analysis at the end of each iteration to identify the top predefined number of cross-layer patterns ranked according to probability of accurate prediction. Optionally, the top predefined number of cross-layer patterns are selected based on a correlation requirement with other previously selected higher ranking features. Alternatively or additionally, combining features is performed by adding another feature of another word in combination and in order. Alternatively or additionally, combining features is performed by adding another feature of the same word in combination.

According to an aspect of some embodiments of the present invention there is provided a computer-implemented method for applying at least one cross-layer pattern to at least one text fragment to identify a target semantic phenomenon, the method comprising: extracting a plurality of feature-values from at least some words in each text fragment of a human-readable text, each feature-value defined by a respective layer; matching or correlating the plurality of feature-values with at least one cross-layer pattern; and outputting an indication of the target semantic phenomenon in each respective text fragment when a match or correlation is found.

Optionally, the matching or correlating with at least one cross-layer pattern is performed by applying a trained statistical classifier to the plurality of feature-values.

According to an aspect of some embodiments of the present invention there is provided a system that identifies a target semantic phenomenon in text, comprising: a data interface for receiving a plurality of training text fragment representing a target semantic phenomenon; a program store storing code; and a processor coupled to the data interface and the program store for implementing the stored code, the code comprising: code to extract, for each word of at least some words of the plurality of training text fragment, a plurality of feature-values defined by respective layers; code to statistically analyze the plurality of feature-values to identify at least one cross-layer pattern comprising a plurality of layers representing a common pattern for the plurality of training text fragments, the common cross-layer pattern defining at least one feature-value of a respective layer of at least one word and at least another feature-value of another respective layer of another word; and code to output the identified at least one cross-layer pattern for identifying a text fragment representing the target semantic phenomenon.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5 is a list of exemplary cross-layer patterns used to identify the presence of a claim made in a sentence, in accordance with some embodiments of the present invention.

DETAILED DESCRIPTION

Figure 1:
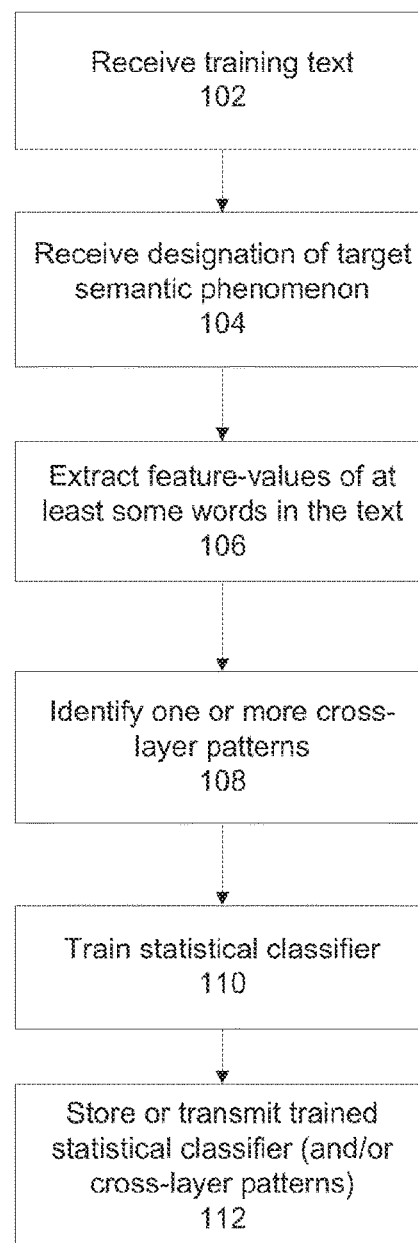
FIG. 1 is a flowchart of a computer-implemented method for outputting at least one cross-layer pattern that identifies a target semantic phenomenon in text, in accordance with some embodiments of the present invention.

The present invention, in some embodiments thereof, relates to machine learning and, more specifically, but not exclusively, to systems and methods for automated machine learning to identify a target in human-readable text.

An aspect of some embodiments of the present invention relates to systems and/or methods (e.g., a processor executing code implementing instructions of the method) that output at least one cross-layer pattern that identifies a target semantic phenomenon in human readable text (e.g., stored as a file, optionally a text file) within a text fragment, for example, a phrase, a predefined number of words (e.g., window), sentence, predefined number of sentences, or paragraph of the text. The systems and/or methods may train a statistical classifier to identify the target semantic phenomenon using the identified cross-layer pattern(s). The target semantic phenomenon may be abstract or difficult to define using a set of human entered instructions, but may be recognizable to a human by reading, for example, a sentence in which an entity (e.g., a person, an organization) makes a claim (i.e., an assertion that something is true without necessarily providing evidence) about a certain topic. The systems and/or methods described herein may output one or more cross-layer patterns indicative of entities making claims about topics in a sentence. A trained statistical classifier may apply the cross-layer pattern(s) to identify the target semantic phenomenon in new text, by correlating and/or matching feature-values extracted from words of the text fragment with one or more cross-layer patterns.

The cross-layer pattern may be considered a common or generic fingerprint or template that identifies the target semantic phenomenon in multi-word text based on feature-values extracted from the text, such as a text fragment, a phrase, a predefined window defining a number of words being analyzed (e.g., 3, 5, 10 words), a single sentence, multiple sentences, and/or a paragraph.

The cross-layer pattern represents a set of layers that are common for multiple sentences (or other text fragments) representing the target semantic phenomenon. The cross-layer pattern generalizes multiple feature-values extracted from multiple words in multiple phrases, text fragments, or sentences, which may include multiple feature-values from the same word, and/or different feature-values from different words. The cross-layer pattern may define the order of the feature-values, and/or the combination of the feature-values. The feature-values may be stored in a memory in association with the processor, for example, as a feature-value vector.

Each feature-value is based on at least one layer. Each word may include feature-values extracted from different levels of the same layer, and/or feature-values from different layers.

Exemplary layers include: one or more semantic categories (e.g., meaning of words), one or more syntactic categories (e.g., order and/or structure of words), one or more domain knowledge categories (e.g., which domain(s) the word belongs to, and/or which layer of the domain), one or more injections of knowledge (e.g., provided by a task expert), a part-of-speech (POS) of the word (e.g., a cat is a noun), a hypernym of the word (a more general word defined by a lexicon, for example, an animal is a hypernym of the word cat), a named entity and type represented by the word (e.g., the word IBM is a named entity of type company), and sentiment represented by the word (e.g., good), and whether the words appears in a predefined lexicon (and optionally if so, which lexicon, for example, a database of words defined for each lexicon).

Optionally, the cross-layer pattern includes one or more negative feature-values and/or layers. The negative feature-values represent feature-values that do not appear in text that includes the target semantic phenomenon. The presence of the negative feature-value in the sentence (or other text fragment) is indicative that the sentence (or other text fragment) does not include the target semantic phenomenon.

Optionally, the cross-layer pattern includes a sequence of attributes and/or feature-values that appear one after the other in the sentence (or other text fragment). The cross-layer pattern may include gaps between the attributes and/or feature-values, for example, the gap represents words which were not found indicative for the pattern and therefore were skipped.

An aspect of some embodiments of the present invention relates to systems and/or methods (e.g., a processor executing code implementing instructions of the method) that apply one or more identified cross-layer patterns to a multi-word human readable text (e.g., stored in a memory as a text file) to identify a target semantic phenomenon as appearing in certain phrase(s), sentence(s), and/or paragraphs of the text. Optionally, a statistical classifier trained using the identified cross layer pattern(s) is applied. The systems and/or methods extract multiple feature-values from multiple words of each text fragment of the text, and match and/or correlate the extracted feature-values to one or more cross-layer patterns, optionally, using the trained statistical classifier. A match and/or correlation with one or more cross-layer patterns is indicative that the text fragment from which the feature-values were extracted represents the target semantic phenomenon. The sentences, text fragments, and/or phrases of the text in which the target semantic phenomenon is identified may be marked for presentation to a user on a display, for example, tagged with virtual tags, stored as a list, highlighted with a color, and/or presented in a window.

The systems and/or methods described herein provide a technical solution to the technical problem of automatically determining (i.e., by instruction code executed by a processor) whether a set of words (e.g., a sentence, a text fragment, a phrase), which may be stored in a text file in a memory of a computer, represent a target semantic phenomenon. The target semantic phenomenon may be easily recognized by a human reading the set of words, but may be difficult for a human to define as a set of instructions for identification by code executed by a processor, for example, since relationships between words of the text fragment and the target semantic phenomenon may be elusive, non-obvious, and non-intuitive. A human may not know how to write code to identify the target semantic phenomenon in a text fragment. The systems and/or methods described herein include a process that automatically identifies the target semantic phenomenon in a text fragment without requiring manual human definitions of the target semantic phenomenon.

The systems and/or methods (e.g., the method implemented by system components) described herein improve performance of a computer, for example, by reducing processing resource requirements (e.g., processor utilization), and/or storage requirements (e.g., memory space), and/or by providing real-time processing (e.g., on the order of seconds or minute) using available computing resources. The improved performance may be obtained, for example, by the systems and/or methods (e.g., implemented by system components) that select the combination of feature-values used in the cross-layer pattern.

The systems and/or methods (e.g., the method implemented by system components) described herein create new data in the form of the trained statistical classifier, and/or the structure of the cross-layer pattern(s) (which may be used by the statistical classifier).

The systems and/or methods described herein relate to an improvement in the field of automated machine learning. Accordingly, the systems and/or methods (e.g., the method implemented by system components) described herein are necessarily rooted in computer technology to overcome an actual technical problem arising in the technical field of automated machine learning.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the following terms may be interchanged with each other as representing a unit of text being analyzed as described herein: a sentence, a phrase, a predefined number of words (e.g., analysis window), a text fragment, a predefined number of sentences, a paragraph, or paragraphs, of the text.

As used herein, the term statistical classifier is broadly used, to include one or more machine learning methods, which receive multiple features as input and output an indication of the target semantic phenomenon (e.g., the presence thereof, the absence thereof, and/or the probability of the presence or absence thereof). The statistical classifier represents, for example, a look-up table, a set of templates, a function or set of functions, a statistical classifier that maps input to an output category, a deterministic classifier, a hash-table, a mapping function, and/or other methods.

As used herein, the term feature-value means the value extracted based on the actual word of the sentence. As used herein, the term layer means a classification category and/or aspect of the word that adds additional information about the respective word. The feature-value is defined by a respective layer. Different feature-values associate with different layers are extracted from each sentence, for example, from different words. For example, a first feature-value defined by a first layer is extracted from a first word, and a second (different) feature-value defined by a second (different) layer is extracted from a second (different) word. In another example, for the same word, a first and a second feature-value defined by a first and second layers are extracted from the same word. For example, for the word cat, the first feature-value noun may be extracted (i.e., a cat is a noun). The feature-value noun is defined by the first layer, a part-of-speech (POS) layer, which may be a syntactic layer. For the same word cat, the second feature-value hypernym may be extracted (i.e., animal is a hypernym of cat). The second feature-value may be defined by a second layer, a lexicon.

Figure 2:
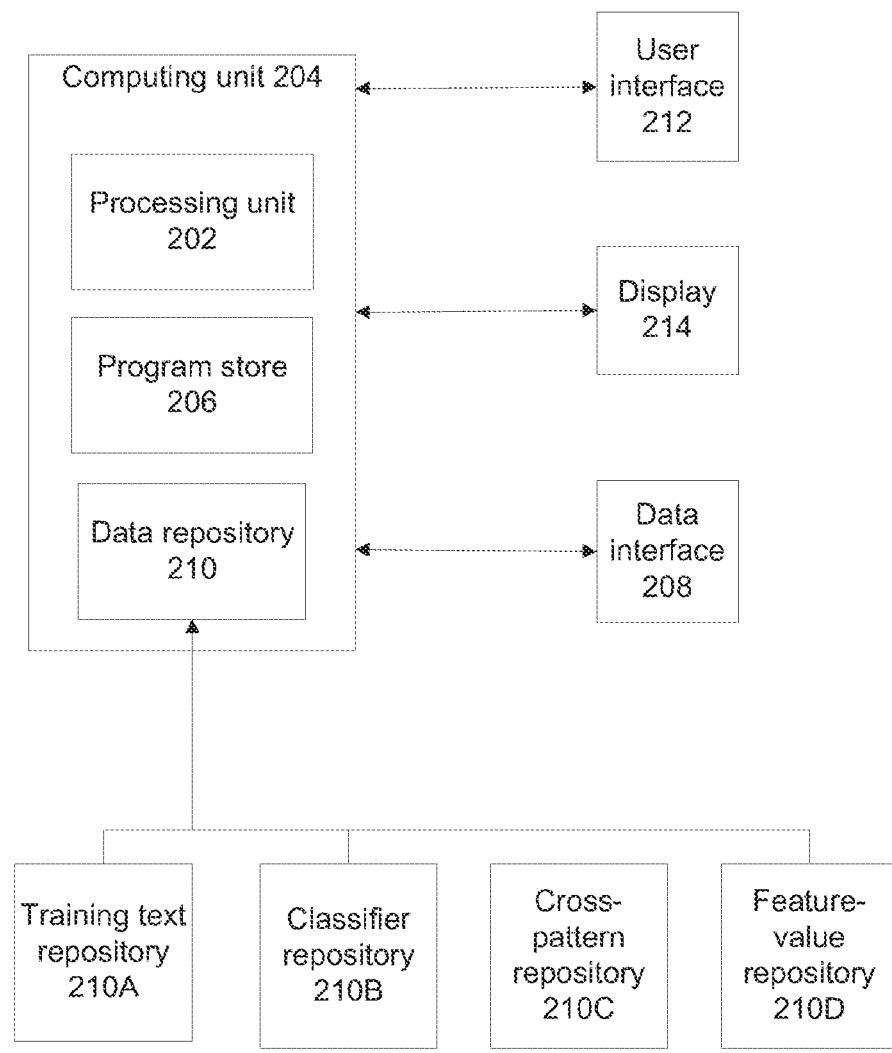
FIG. 2 is a block diagram of a system that applies at least one cross-layer pattern to identify a target semantic phenomenon in text, in accordance with some embodiments of the present invention.

Reference is now made to FIG. 1, which is a flowchart of a computer-implemented method for outputting at least one cross-layer pattern that identifies a target semantic phenomenon in human readable text (e.g., multiple words, a phrase, a sentence), in accordance with some embodiments of the present invention. The cross-layer patterns may be used to train a statistical classifier to output an indication of whether a sentence represents the target semantic phenomenon. Reference is also made to FIG. 2, which is a block diagram of a system 200 that outputs at least one cross-layer pattern that identifies a target semantic phenomenon in text, in accordance with some embodiments of the present invention. The method and/or system 200 allow a user to define text (e.g., multiple sentences) that represents the target semantic phenomenon (which may be abstract and/or difficult to define instructions to identify) and to automatically identify one or more cross-layer patterns (based on feature-values extracted from the text) that represent the presence of the target semantic phenomenon within the text.

The acts of the method of FIG. 1 may be performed by the components of system 200, optionally by a processing unit 202 of a computing unit 204 executing instructions stored as code in a program store 206.

System 200 includes computing unit 204, which may be implemented, for example, as a server (e.g., providing services to one or more client terminals over a network connection via a data interface 208), as a web server (e.g., providing service to clients terminals using a web browser), and/or a client running locally stored code. Computing unit 204 may be implemented as a hardware component (e.g., standalone computing unit), as a software component (e.g., implemented within an existing computing unit), and/or as a hardware component inserted into an existing computing unit (e.g., plug-in card, attachable unit). The server implementation may provide services to client terminals by providing software as a service (SAAS), providing an application that may be installed on the client that communicates with the server, and/or providing functions using remote access sessions. Other exemplary implementations of computing unit 204 include, for example, a mobile device, a desktop computer, a thin client, a Smartphone, a Tablet computer, a laptop computer, a wearable computer, glasses computer, and a watch computer.

Processing unit 202 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processing unit(s) 202 may include one or more processors (homogenous or heterogeneous), which may be arranged for parallel processing, as clusters and/or as one or more multi core processing units.

Program store 206 store code instructions executed by processing unit 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing unit 204 includes a data repository 210 for storing data, for example, a memory, a hard-drive, an optical disc, a storage unit, an interface to a remote storage server, and interface to a cloud server, and/or other storage units. Data repository 210 may include a training text repository 210A storing text for training the statistical classifier (e.g., as described herein), a classifier repository 210B storing trained statistical classifiers to identify different target semantic phenomena (e.g., as described herein), a cross-layer pattern repository 210C storing identified cross-layer patterns (e.g., as described herein), and a feature-value repository 210D that stores instructions for extraction of feature-values from sentences (e.g., as a script, a set-of-rules, code, or other implementations).

Computing unit 204 includes or is in communication with a user interface 212 (which may be integrated with a display 214, or be implemented as a separate device), for example, a touchscreen, a keyboard, a mouse, and voice activated software using speakers and microphone.

At 102, a training text that includes multiple training sentences is received by computing unit 204, and may be stored in training text repository 210A. The training text may include paragraphs and/or phrases. The training text may be stored, for example, as a file, optionally a text file, a word processing file, a binary file, or other formats.

As used herein, the term sentence sometimes means and/or may sometimes be interchanged with, a phrase, or other text portions including multiple words that together form a concept or context.

The training text may be manually entered by the user, for example, using a keyboard (i.e., user interface 212) and/or touch-screen (e.g., display 214), transmitted over a network (e.g., as a file, as network messages, as packets, optionally via data interface 208), and/or retrieved from a storage location (e.g., from a disc, removable memory, storage server, and/or other storage device), and/or designated as a link to a remote location (e.g., a link to a webpage including text). Examples of text include: online news articles, passages from a book, and paragraphs from a report.

At 104, a designation of one or more training sentences in the training text representing a target semantic phenomenon are received by computing unit 204. The designation may be manually entered by the user using user interface 212 (e.g., using a graphical user interface presented on display 214), for example, clicking, highlighting, and/or checking boxes of training sentences that represent the target semantic phenomenon. The designation may be provided by the user, for example, by providing a list of sentences that represent the target semantic phenomenon, such as in a designated stored file.

Optionally, a designation of one or more training sentences in the training text that do not represent the target semantic phenomenon is received by computing unit 204, for example, by the user providing a list of sentences that do not represent the target semantic phenomenon (e.g., in a different file than the file representing the target semantic phenomenon), and/or marking the training sentences that do not represent the target semantic phenomenon (e.g., using a different marking than the designation of sentences that represent the target semantic phenomenon). Alternatively, no explicit designation of sentences that do not represent the target semantic phenomenon is provided. Code may automatically assume that non-designated sentences (i.e., not designated as representing the target semantic phenomenon) do not represent the target semantic phenomenon.

It is noted that blocks 102 and 104 may be performed simultaneously, for example, by the user using data interface 208 to upload two files, a first file including sentences representing the target semantic phenomenon and a second file including sentences that do not represent the target semantic phenomenon.

Exemplary target semantic phenomenon include: a definition sentence (i.e., a sentence that explains a term or concept), a statement providing evidence for or against a topic, a statement made by an entity that something is the case about a topic without evidence (i.e., a sentence including a claim), and a sentiment expressed by an entity about a topic.

At 106, code stored in program store 206 executed by processing unit 202 extracts, for each word (or phrase made up of multiple words) of at least some words of each training sentence of the training text, one or more feature-values representing one or more layers (e.g., one or more classification categories). It is noted that some words may be skipped, for example, a conjunction. Alternatively, all words are considered, even conjunctions.

The feature-values may be automatically identified by the code, for example, based on predefined feature-values stored in a feature repository 210D (e.g., a database, code that extracts feature-values, text based rules defining feature-values, and/or other implementations), which may be stored in data repository 210 and/or other locations.

Optionally, one or more of the layers include a hierarchy having multiple levels. The feature-values may be extracted based on one or multiple levels of the hierarchy. Optionally, one or more of the layers include flat levels, having a single level without a hierarchy. The feature-value may be extracted based on the flat level of the layer. The systems and/or methods described herein may identify the most suitable level of the hierarchy, which represents words in different sentences, while excluding other words that do not appear in the sentences. When the training sentence set includes crimson, violet, and lavender, the color purple from the second level may be selected. The feature color from the first level may not necessarily be selected, since color may be too general, encompassing other colors on the second level that are not included in the training sentences. When a new training sentence including yellow is analyzed, the feature-value color may be selected.

Exemplary layers include: semantic, syntactic, domain knowledge, injection of knowledge by task expert, part-of-speech (POS) tag of the word, hypernym of the word, a named entity represented by the word, sentiment represented by the word, word appearing in a predefined lexicon At 108, the feature-values identified and/or extracted for each training sentence are statistically analyzed (e.g., by code stored in program store 206 executed by processing unit 202) to identify a cross-layer pattern common for the set (e.g., all received) of training sentences. The cross-layer pattern includes multiple feature-values, extracted from at least two words of each sentence, each representing a different layer. The cross-layer pattern represents a generalization of the commonality between sets of feature-values extracted from words of sentences representing the target semantic phenomenon. The cross-layer pattern correlating with the target semantic phenomenon in the set of received training sentences may be defined by a correlation requirement, for example, a statistical probability threshold and/or range. The identification of the cross-layer pattern based on extracted features in a new sentence is indicative of the new sentence representing the target semantic phenomenon.

The cross-layer pattern represents a common general structure of sentences that represent the target semantic phenomenon. The cross-layer pattern is based on identifying words that best represent commonality between the different sentences. A generalization across different layers is identified to capture the general commonality between the sentences.

Optionally, the cross-layer pattern includes one or more negative feature-values that do not appear in the sentence designated as representing the target semantic phenomenon. The negative feature-values may appear in sentences that do not represent the target semantic phenomenon. For example, the cross-layer pattern [no digit] [verb][sentiment] identifies sentences that do not contain a digit and do have a verb word followed by a sentiment word (optionally with a gap between the words).

Optionally, the cross-layer pattern includes one or more words in the sentence identified with multiple different layers. Each layer may be based on a different feature-value extracted from the same word.

Optionally, the cross-layer pattern includes two or more different words in the sentence identified with different layers. Different feature-values may be extracted from the different words.

Optionally, the cross-layer pattern includes a defined combination and/or order of two or more layers. The combination is based on two or more feature-values (from different layers) appearing within the same word at the same time. The order is based on two or more feature-values (from different c layers) appearing within different words of the same sentence at the same time. The order may be defined by the order of the words in the sentence. The order may include multiple options, for example, different permutations of the order, such as feature-value 1 followed by feature-value 2, or feature-value 2 followed by feature-value 1.

Optionally, the cross-layer pattern includes one or more defined gaps between feature-values, such a gap between as two or more layers. The gap may be defined as occurring between feature-values extracted from adjacent words, such as a word from which no feature-value is extracted. The gap may be defined as a combination and/or as an order.

An example of a cross-layer pattern is now provided. The following three sentences are designated as including a claim (i.e., an assertion by an entity, such as a person, organization, or party, about a certain topic). Each claim of each sentence is related to a different topic:

(1) Opponents argue that the open primary is unconstitutional.

(2) Richard says that proprietary software commonly contains malicious features.

(3) The majority stated that the First Amendment does not guarantee the right to offend others.

The cross-layer pattern identified for the above three sentences is based on a common structure shared by the three sentences, which may be represented as:

[someone] [argue/say/state] [that] [something-related-to-the-topic]

The cross-layer pattern identified for the above three sentences, which may be used to identify the presence of a claim in a new sentence, may be formally represented by the following set of combination of feature-values:

[noun] [hypernym of the verb express] [thatconj] [noun & a word from the topic's lexicon]

Figure 3:
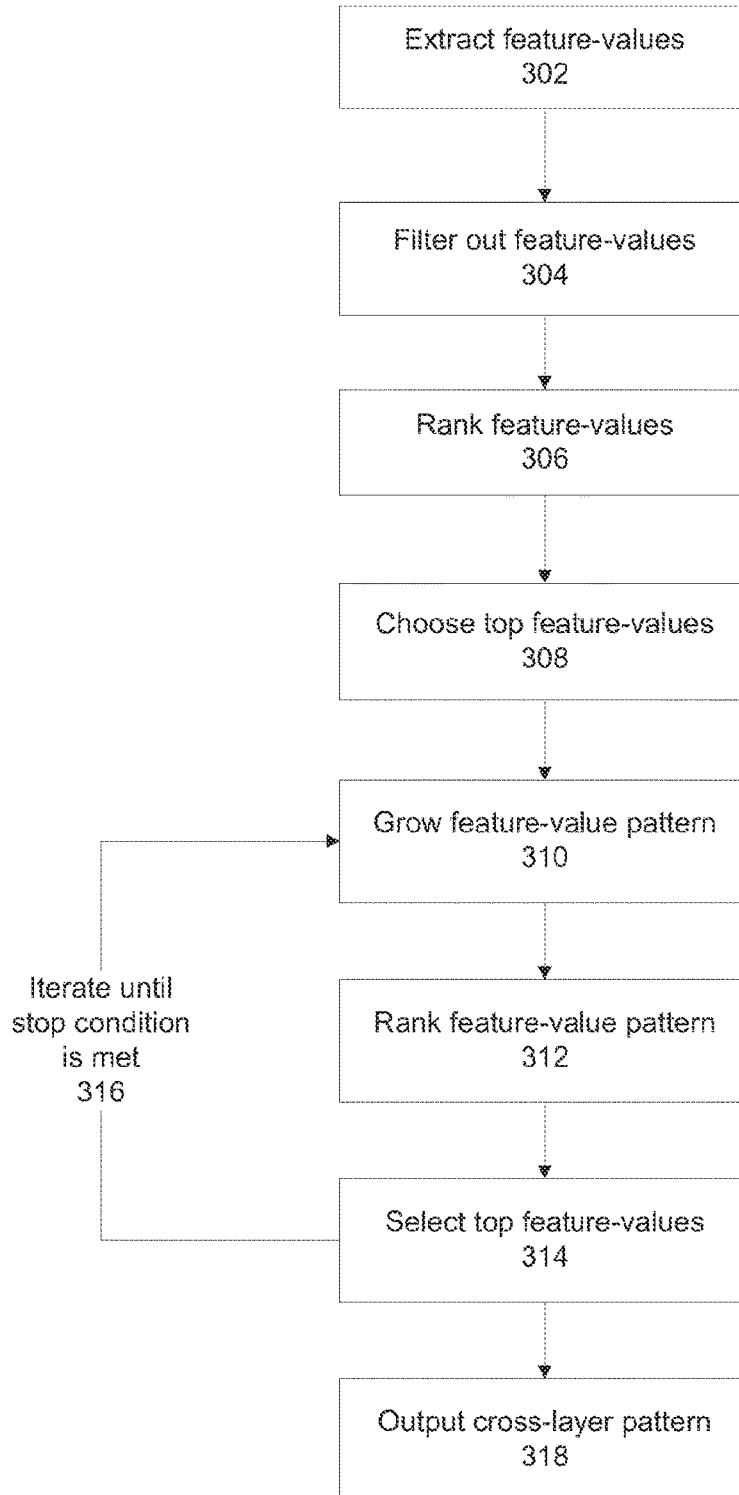
FIG. 3 is a flowchart of an exemplary computer-implemented method that combines features to create statistically significant cross-layer patterns indicative of a text fragment representing the target semantic phenomenon, in accordance with some embodiments of the present invention.

Reference is now made to FIG. 3, which is a flowchart of an exemplary computer-implemented method that combines feature-values to create statistically significant cross-layer patterns indicative of a respective sentence representing the target semantic phenomenon, in accordance with some embodiments of the present invention. The acts of the method may be executed by code stored in program store 206 of computing unit 204, executed by processing unit 202. The method may improve utilization of computing resources (e.g., reduced processor and/or memory requirements and/or utilization) by efficiently and automatically building cross-layer patterns.

The method of FIG. 3 (e.g., code stored in program store 206 that implemented the method) receives as input training sentences designated as representing the target semantic phenomenon, and optionally training sentences designated as not representing the target semantic phenomenon, as described with reference to FIG. 1.

At 302, multiple feature-values are extracted from each sentence. Optionally, multiple feature-values are extracted for each word of each sentence (some words may be skipped). The extracted feature-values may be based on, for example, an automated set of feature-values for extraction (e.g., brute force method that extracts all possible features), manually defined set of feature-values (e.g., defined by a user in a file as a script or other instructions), and/or defined by a database, code, a script, a file, or other implementations.

At 304, non-frequent feature-values may be filtered out, for example, feature-values appearing in less than a predefined percentage of the training sentences, for example, less than about 0.1%, or 0.5%, or 1%, or other values. Filtering the non-frequent feature-values may exclude rare feature-values from the processing, which may reduce the memory storage size of the cross-layer patterns, and/or improve processor utilization by preventing attempts to extract rare feature-values.

At 306, the extracted feature-values are ranked. The ranking may be based on information gain provided by the respective feature-value. The information gain may be calculated by calculating entropy with and without the respective feature-value. The information gain may represent the contribution of the respective feature-value to the ability (e.g., probability) of correctly identifying the presence of the target semantic phenomenon in the sentence.

At 308, the top feature-values are selected. The top feature-values may be selected based on a predefined number of top feature-values, all feature-values above an information gain threshold, or other methods.

The feature-values may be selected based on not being correlated (or a correlation less than a predefined correlation requirement) with other previously selected, higher ranking feature-values. Correlations may be measured by normalized mutual information between attributes for example, seed feature-values. For negative feature-values, each seed feature may be doubled with its negative.

At 310, each uni-feature-value pattern is grown into a multiple-feature-value pattern. Each individual feature-value (e.g., [noun]) represents a seed that is grown by the addition of other feature-values.

Optionally, each individual feature-value is added to another feature-value of another word, to create a combination of feature-values. The order of the feature-values may be defined as part of the feature-value combination. The feature-values may be grown to the left and/or to the right, by considering words before the feature-value word and/or words after the feature-value word. For example, ([noun], [SENTIMENT]).

Alternatively or additionally, each individual feature-value of a certain word is combined with another feature-value of the same word. The other feature-value may be of a different classification category, and/or a different layer of the same classification category. For example, ([noun, dobj]).

At 312, the created feature-pattern (i.e., the combination of feature-values, also termed cross-layer pattern) is analyzed, optionally using a greedy analysis, to identify the top (e.g., predefined number) of cross-layer patterns. The cross-layer pattern is ranked according to information gain and/or probability of accurate prediction (e.g., as discussed with reference to block 306).

At 314, the top (e.g., predefined number of) cross-layer patterns are selected. The patterns may be selected based on a correlation requirement with other previously selected higher ranking feature-values, for example, as described with reference to block 308.

At 316, each cross-layer pattern is grown by iteratively combining additional feature-values (of the same word and/or other words) to generate longer cross-layer patterns. The cross-layer pattern is grown until a stop condition is met, for example, a maximal storage size of the pattern, a maximum number of feature-values in the pattern, a maximal estimated processing time of a new sentence using the pattern, or other stop condition methods.

At 318, the created cross-layer pattern is stored in cross-layer pattern repository 210C of data repository 210, stored in another location (e.g., a remote server, a cloud server), and/or transmitted (e.g., over a network to a server and/or client terminal).

Referring now back to FIG. 1, at 110, code stored in program store 206 executed by processing unit 202 of computing unit 204 trains a statistical classifier to identify the target semantic phenomenon in next text including one or more new sentences. The statistical classifier processes feature-values extracted from the new text to identify a cross-layer pattern in the new sentence of the new text that is indicative of the new sentence representing the target semantic phenomenon.

The statistical classifier may be trained using as input the identified cross-layer pattern (which may define the extracted feature-values) and the target semantic phenomenon (or absence of the target semantic phenomenon) of each respective training sentence. The statistical classifier identifies correlations between the cross-layer pattern and the target semantic phenomenon, such that features extracted for a new sentence may be correlated to the target semantic phenomenon.

A single-class classifier, and/or multiple single-class classifiers, and/or a multi-class classifier, and/or multiple multi-class classifiers may be trained. For example, a combination of classifiers may be trained to identify different target semantic phenomenon, for example a cascade of classifiers, a boosting topology of classifiers, or a parallel classification scheme.

Optionally, the classifier is trained based on supervised learning. Examples of code instructions to train the classifier include: Neural Networks, Support Vector Machines, Decision Trees, Hard/Soft Thresholding, Naive Bayes Classifiers, or any other suitable classification system and/or method. Alternatively or additionally, the classifier is trained (and/or machine learning takes place) based on unsupervised learning, for example, k-Nearest Neighbors (KNN) clustering, Gaussian Mixture Model (GMM) parameterization, or other suitable unsupervised methods.

The trained statistical classifier may output a probability indicative of the accuracy of correctly identifying the target semantic phenomenon.

Optionally, multiple trained statistical classifiers are trained. Each classifier may identify one type of target semantic phenomenon.

At 112, the trained statistical classifier is stored (e.g., in classifier repository 210B in data repository 210) or transmitted via data interface 208 (e.g., over a network) to a remote server for local use by a client terminal and/or for remote storage. The trained statistical classifier is used to analyze new text to identify one or more new sentences representing the target semantic phenomenon. Alternatively or additionally, the identified cross-layer patterns are stored and/or transmitted. The cross-layer patterns may be used to identify the target semantic phenomenon in a sentence (e.g., by matching or correlating feature-values extracted from the sentence), and/or the cross-layer patterns may be used by another process (e.g., an external computing unit, such as a client terminal or server) to train a statistical classifier.

Figure 4:
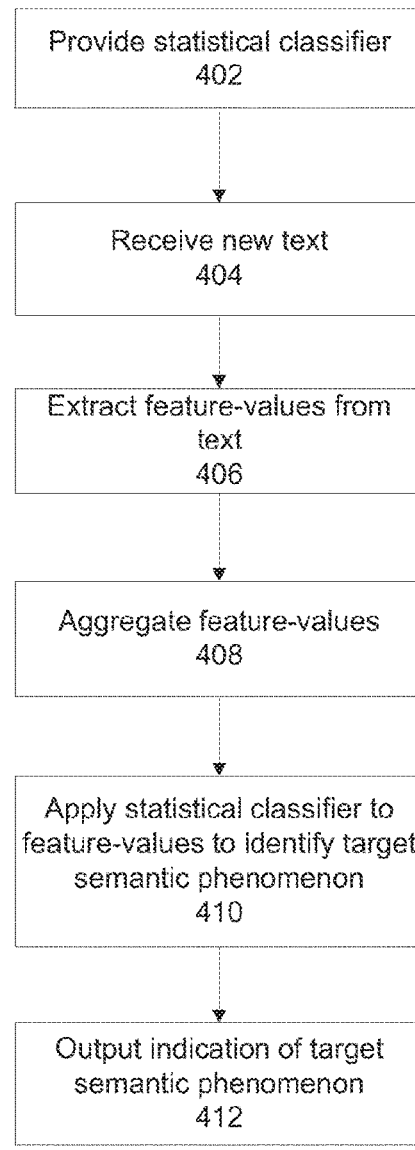
FIG. 4 is a flowchart of a computer-implemented method for applying at least one cross-layer pattern to text to identify the presence of a target semantic phenomenon, in accordance with some embodiments of the present invention.

Reference is now made to FIG. 4, which is a flowchart of a computer-implemented method for applying cross-layer patterns (optionally a trained statistical classifier) to new human readable text (e.g., including at least one sentence or phrase) to identify the presence of a target semantic phenomenon, in accordance with some embodiments of the present invention. The method may be implemented by processing unit 202 of computing unit 204 executing code instructions stored in program store 206.

At 402, one or more cross-layer patterns, optionally implemented as a statistical classifier trained to identify sentences in text as representing a target semantic phenomenon, are provided. It is noted that multiple statistical classifiers and/or multiple cross-layer patterns may be applied. Each statistical classifier may be trained to identify one type of target semantic phenomenon. Alternatively or additionally, the same statistical classifier may be trained to identify multiple types of target semantic phenomenon. The trained statistical classifier may be obtained from a storage unit, for example, classifier repository 210B.

At 404 a new text that includes one or more sentences or phrases is received by computing unit 204. The new text may be received, for example, by a user manually entering the text (e.g., using a keyboard), via a text file storing the text, using a link to an web server hosting a web page with the text, or other methods.

At 406, code extracts feature-values from at least some words in each sentence (e.g., all words). Each extracted feature-value represents a respective layer. The feature-values may be extracted based on the cross-layer patterns defined by the trained statistical classifier. Optionally, all (or a subset of) feature-values included in different cross-layer patterns are extracted.

At 408 the extracted feature-values may be aggregated, optionally for each sentence. The aggregated feature-values may be organized as a feature-value vector.

At 410 a trained statistical classifier is applied to each aggregated feature set (e.g., to the feature-value vector). The trained statistical classifier may match or correlate the aggregated feature-values to one or more predefined cross-layer patterns, to identify the presence of the target semantic phenomenon.

Optionally, the trained statistical classifier outputs a probability of the accuracy of identifying the presence of the target semantic phenomenon, for example, when the aggregated feature-values correlate with one or more of the predefine cross-layer patterns, but do not match the pattern 100%. Alternatively, an identification of the presence of the target semantic phenomenon is only made when the aggregated feature-values match one of the cross-layer patterns.

At 412, an output of the indication of the presence (or lack thereof) of the target semantic phenomenon is provided. The output may be presented on display 214, for example, within a GUI, which may mark sentences of the text that represent the target semantic phenomenon (e.g., with a highlight, with an underline, with a bolding of letters, or other methods). In another example, a file that includes the sentences representing the target semantic phenomenon may be created and saved in memory.

An example of cross-layer patterns learned from training sentences to identify the presence of a claim made in the sentence is provided in FIG. 5. The statistical classifier trained based on the training sentences includes the multiple cross-layer patterns, and identifies a new sentence as including a claim when one of the cross-layer patterns is matched (or correlated) to feature-values extracted from the new sentence. The feature-values extracted from the new sentence may include all (or selected subset of) the types of feature-values represented within the cross-layer patterns.

Legend:
@ syntactic attribute
> semantic attribute
>> semantic attribute
^ syntactic based attribute
TOPIC: the term appears in the motion topic
TOPIC_LEX_MATCH: the term appears in a lexicon of the motion topic words
CLAIM_LEX_MATCH: the term appears in a claim words lexicon
SENTIMENT: the term appears in a sentiment words lexicon
[ ] attribute set of a single term (may include multiple attributes
{ } the whole pattern, gaps may occur between single terms The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant statistical classifiers and computing units will be developed and the scope of the terms statistical classifier and computing unit are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for outputting at least one cross-layer pattern to identify a target semantic phenomenon in a text document, the method comprising:
   using at least one hardware processor for executing a code for:
      extracting, for each word of at least some words of each training text fragment of a plurality of training text fragments designated as representing a target semantic phenomenon, a plurality of feature-values defined by respective layers;
      statistically analyzing the plurality of feature-values identified for the plurality of training text fragments to identify at least one cross-layer pattern comprising a plurality of layers representing a common pattern for the plurality of training text fragments, the common cross-layer pattern defining at least one feature-value of a respective layer of at least one word and at least another feature-value of another respective layer of another word; and
      generating instructions to present a marked human-readable text document by using the identified at least one cross-layer pattern for automatically marking at least one text fragment representing the target semantic phenomenon in a human-readable text document.

2. The method of claim 1, further comprising:
   training a statistical classifier to identify the target semantic phenomenon by matching or correlating between feature-values extracted from a new text fragment and the at least one cross-layer pattern; and
   wherein the trained statistical classifier is used for analyzing the human-readable text document to identify the at least one text fragment representing the target semantic phenomenon.

3. The method of claim 2, wherein the extracting of the plurality of feature-values defined by respective layers is performed for training text fragments designated as not representing the target semantic phenomenon, and the classifier is trained based on the feature-values extracted from the training text fragments designated as not representing the target semantic phenomenon.

4. The computer-implemented method of claim 1, wherein the cross-layer pattern includes at least one negative feature-value that does not appear in a text fragment that includes the target semantic phenomenon.

5. The computer-implemented method of claim 1, wherein each layer of the plurality of layers of the at least one cross-layer pattern is a member selected from the group consisting of: semantic, syntactic, domain knowledge, injection of knowledge by task expert, part-of-speech (POS) tag of the word, hypernym of the word, a named entity represented by the word, sentiment represented by the word, word appearing in a predefined lexicon.

6. The computer-implemented method of claim 1, wherein the cross-layer pattern includes at least one word in the text fragment associated with multiple different layers.

7. The computer-implemented method of claim 1, wherein the multiple different layers are combined for the at least one word.

8. The computer-implemented method of claim 1, wherein the cross-layer pattern includes at least two different words in the text fragment each associated with a different layer.

9. The computer-implemented method of claim 1, wherein the different layers associated with the at least two different words are defined by an order within the cross-layer pattern.

10. The computer-implemented method of claim 1, wherein the target semantic phenomenon is a member of the group consisting of: a definition, a statement providing evidence for or against a topic, a statement made by an entity that something is the case about a topic without evidence, and a sentiment expressed by an entity about a topic.

11. The computer-implemented method of claim 1, wherein the cross-layer pattern includes at least one defined gap between at least two layers each from a different word.

12. The computer-implemented method of claim 1, wherein the cross-layer pattern is created by iteratively combining features to generate longer cross-layer patterns.

13. The computer-implemented method of claim 12, further comprising applying a greedy analysis at the end of each iteration to identify the top predefined number of cross-layer patterns ranked according to probability of accurate prediction.

14. The computer-implemented method of claim 13, wherein the top predefined number of cross-layer patterns are selected based on a correlation requirement with other previously selected higher ranking features.

15. The computer-implemented method of claim 12, wherein combining features is performed by adding another feature of another word in combination and in order.

16. The computer-implemented method of claim 12, wherein combining features is performed by adding another feature of the same word in combination.

17. A computer-implemented method for applying at least one cross-layer pattern to at least one text fragment to identify a target semantic phenomenon, the method comprising:
   extracting a plurality of feature-values from at least some words in each text fragment of a human-readable text, each feature-value defined by a respective layer;
   matching or correlating the plurality of feature-values with at least one cross-layer pattern; and
   outputting an indication of the target semantic phenomenon in each respective text fragment when a match or correlation is found.

18. The computer-implemented method of claim 17, wherein the matching or correlating with at least one cross-layer pattern is performed by applying a trained statistical classifier to the plurality of feature-values.

19. A system that identifies a target semantic phenomenon in text, comprising:
   a data interface for receiving a plurality of training text fragment representing a target semantic phenomenon;
   a program store storing code; and
   at least one hardware processor coupled to the data interface and the program store for implementing the stored code, the code comprising:
   code to extract, for each word of at least some words of the plurality of training text fragment, a plurality of feature-values defined by respective layers;
   code to statistically analyze the plurality of feature-values to identify at least one cross-layer pattern comprising a plurality of layers representing a common pattern for the plurality of training text fragments, the common cross-layer pattern defining at least one feature-value of a respective layer of at least one word and at least another feature-value of another respective layer of another word; and code to generate instructions to present a marked human-readable text document by using the identified at least one cross-layer pattern for automatically marking at least one text fragment representing the target semantic phenomenon in the marked human-readable text document.

* * * * *